(12) United States Patent
Zinck et al.

(10) Patent No.: US 9,214,041 B2
(45) Date of Patent: Dec. 15, 2015

(54) METHOD FOR ENHANCING THE DETERMINATION OF A SEISMIC HORIZON

(71) Applicants: TOTAL SA, Courbevoie (FR); Centre National de la Recherche Scientifique—CNRS, Paris (FR); Universite de Bordeaux, Bordeaux (FR); École Nationale Supérieure des Sciences Agronomiques de Bordeaux-Aquitaine, Gradignan (FR); Institut Polytechnique de Bordeaux, Talence (FR)

(72) Inventors: Guillaume Zinck, Talence (FR); Marc Donias, Talence (FR); Jacques Daniel, Talence (FR); Olivier Lavialle, Talence (FR); Sébastien Guillon, Pau (FR)

(73) Assignees: Total SA, Courbevoie (FR); Centre National de la Recherche Scientifique—CNRS, Paris (FR); Universite de Bordeaux, Bordeaux (FR); Ecole Nationale Supérieure des Sciences Agronomique de Bordeaux-Aquitaine, Gradignam (FR); Institute Polytechnique de Bordeaux, Talence (FR)

( * ) Notice: Subject to any disclaimer, the term of this patent is extended or adjusted under 35 U.S.C. 154(b) by 0 days.

(21) Appl. No.: 14/420,267
(22) PCT Filed: Aug. 6, 2013
(86) PCT No.: PCT/EP2013/066492
§ 371 (c)(1),
(2) Date: Feb. 6, 2015
(87) PCT Pub. No.: WO2014/023737
PCT Pub. Date: Feb. 13, 2014

(65) Prior Publication Data
US 2015/0199845 A1 Jul. 16, 2015

Related U.S. Application Data
(60) Provisional application No. 61/681,005, filed on Aug. 8, 2012.

(51) Int. Cl.
G06K 9/00 (2006.01)
G06T 17/05 (2011.01)
(Continued)

(52) U.S. Cl.
CPC . *G06T 17/05* (2013.01); *G01V 1/30* (2013.01); *G06T 17/10* (2013.01);
(Continued)

(58) Field of Classification Search
CPC .............................. G01P 15/093; G01V 1/301
See application file for complete search history.

(56) References Cited

U.S. PATENT DOCUMENTS 6,615,158 B2 * 9/2003 Wenzel et al. ................ 702/183
7,127,100 B2 * 10/2006 Wenzel et al. ................ 382/154
(Continued)

FOREIGN PATENT DOCUMENTS

FR 2 869 693 A1 11/2005

OTHER PUBLICATIONS

J. Lomask, et al., "Flattening with geological constraints", *Annual Meeting Expanded Abstracts*, Society of Exploration Geophysicists (SEG), Jan. 1, 2006, pp. 1053-1056.
(Continued)

*Primary Examiner* — Tom Y Lu
(74) *Attorney, Agent, or Firm* — Patterson Thuente Pedersen, P.A.

(57) ABSTRACT

The invention pertains to a method for enhancing the determination, from a seismic image of at least a portion of a seismic horizon in a three-dimensional domain. The method comprises: receiving the seismic image; receiving a plurality of related control points; defining pseudo-rectangles; for each pseudo-rectangle applying a diffeomorphic transformation F: defining a new domain; transforming points of the seismic image; transforming said pseudo-rectangle into a corresponding rectangle; applying a horizon reconstruction algorithm to the transformed points, to determine a part of a transformed horizon, the reconstruction comprising solving a Poisson equation; and computing a part of the horizon, said computing comprising applying an inverse diffeomorphic transformation $F^{-1}$ to the determined part of a transformed horizon.

14 Claims, 8 Drawing Sheets

(51) Int. Cl.
*G01V 1/30* (2006.01)
*G06T 17/10* (2006.01)

(52) U.S. Cl.
CPC ............ *G01V 2210/643* (2013.01); *G06T 2207/20041* (2013.01); *G06T 2207/20048* (2013.01); *G06T 2207/20068* (2013.01); *G06T 2207/30181* (2013.01)

(56) References Cited

U.S. PATENT DOCUMENTS

| | | | | |
|---|---|---|---|---|
| 8,694,262 | B2 * | 4/2014 | Schultz et al. | 702/18 |
| 8,750,072 | B2 * | 6/2014 | Luo et al. | 367/21 |
| 2013/0083973 | A1 | 4/2013 | Guillon et al. | |

OTHER PUBLICATIONS

J. Lomask, et al., "Flattening without picking", Society of Exploration Geophysicists (SEG) vol. 71, No. 4, Jul. 1, 2006, pp. P13-P20.

G. Zinck, et al., "Discontinuous seismic horizon tracking based on a poisson equation with incremental dirichlet boundary conditions", Image Processing (ICIP), *2011 18th IEEE International Conference On, IEEE*, Sep. 11, 2011, pp. 3385-3388.

Hongzhi Zhong, et al., "Solution of Poisson and Laplace equations by quadrilateral quadrature element", International Journal of Solids and Structures, vol. 35, No. 21, Jan. 1, 1998, pp. 2805-2819.

Jack Hoyes, et al., "A review of "global" interpretation methods for automated 3D horizon picking", The Leading Edge, Jan. 1, 2011, pp. 39-47.

Guillaume Zinck, et al., "Fast seismic horizon reconstructions based on local dip transformation", Journal of Applied Geophysics, vol. 96, Sep. 1, 2013, pp. 11-18.

Guillaume Zinck, et al., "Reconstruction d'hypersurfaces de champs de normales sous constraints—Application 'a l'analyse stratigraphique des images sismiques", Dec. 18, 2012, Chapter 1, Section 1.2,4; Chapter 3, Section 3.3.

PCT International Search Report for PCT/EP2013/066492, mailed Mar. 3, 2014, 3 pgs.

PCT Written Opinion for PCT/EP2013/066492, mailed Mar. 3, 2014, 7 pgs.

* cited by examiner

METHOD FOR ENHANCING THE DETERMINATION OF A SEISMIC HORIZON

RELATED APPLICATIONS

The present application is a National Phase entry of PCT Application No. PCT/EP2013/066492, filed Aug. 6, 2013, which claims priority from U.S. Patent Application No. 61/681,005, filed Aug. 8, 2012, said applications being hereby incorporated by reference herein in their entirety.

TECHNICAL FIELD

The invention pertains to the field of methods implemented in order to determine seismic horizons. The invention more specifically relates to a method that enhances the determination of a seismic horizon without suffering from some of the drawbacks of the prior art.

BACKGROUND OF THE INVENTION

Geological surveys involving generators of seismic waves and detectors of their reflections in the ground are often conducted to determine the position of oil reservoirs and/or to get to know the composition and thickness of the many layers that form the underground. Seismic reflection techniques consist in generating a seismic wave that propagates through the ground and reflects at the interfaces thereof. A precise measurement of these echoes and more specifically of their arrival times enables a determination of the shape, depth and composition of the layers that the seismic waves went through.

In a first phase following the measurement of these data signals, image generation algorithms, well-known in the art, are used to reconstruct a raw picture of the underground in the form of seismic images, sometimes also referred to as echographic images. These images can be either two-dimensional in shape or three-dimensional. Such seismic images comprise pixels the intensity of which is correlated to a seismic wave amplitude, dependent on the local impedance variation.

Geophysicists are used to manipulating such seismic images displaying information relating to amplitude. By merely looking at such seismic images, a geophysicist is capable of identifying areas of the underground having distinct characteristics, and use these to determine the corresponding structure of the underground.

Automatic techniques for extracting structural information from seismic images are known. These generally involve seismic horizon reconstruction algorithms that analyze amplitude gradients in a seismic image and extract the tangent of the local dip in a direction that is transverse to that gradient. Examples of techniques used for reconstructing a seismic horizon using a seismic image are for example described in the French patent FR 2 869 693 and US application US 20130083973.

Sometimes the exact depth of a layer can be known due to other data inputs or because of reliable geological information. Therefore, it is sometimes useful to define fixed related control points on a seismic image which are known to belong to a seismic horizon. It is then useful to compute a seismic horizon by implementing a seismic reconstruction algorithm with imposed conditions on a certain limited number of related control points.

One method for reconstructing a seismic horizon with imposed conditions on a number of related control points is described in the article "Flattening with geological constraints" in *Annual Meeting Expanded Abstracts*, Society of Exploration Geophysicists (SEG), 2006, pp. 1053-1056 by J. Lomask and A. Guitton.

The method disclosed in this article considers a global approach by solving a two-dimensional nonlinear partial derivative equation relied on local dip. The partial derivative equation is solved using a Gauss-Newton approach by an iterative algorithm whose crucial step is the resolution of a Poisson equation. The approach is global in that it systematically computes a seismic horizon on the entire domain of the seismic image, no matter the number of related control points received as input.

Even if it provides realistic seismic horizons, the method proposed by Lomask et al. suffers from two major drawbacks: its computational cost is often prohibitive for large data volumes, and it requires solving an iterative algorithm on the entire domain of the seismic image every time a change occurs in the number and/or position of the related control points received as input.

The high computational cost of the horizon reconstruction algorithm implemented by Lomask is further increased by the computational means for solving the Poisson equation that forms the core step of the iterative algorithm. In general, another iterative algorithm may be used to solve the Poisson equation. The method disclosed by Lomask therefore comprises an iterative algorithm within another iterative algorithm.

To overcome these drawbacks, an enhancement of the determination of a seismic horizon that optimizes the computational speed of the horizon reconstruction algorithm is sought.

SUMMARY OF THE INVENTION

To achieve such an optimization and thereby overcome the drawbacks of the prior art, the invention provides a method for enhancing the determination, from a seismic image, of at least a portion of a seismic horizon in a three-dimensional domain comprising axes $\vec{X}, \vec{Y}, \vec{Z}$. In this three-dimensional domain, the seismic horizon is a function of coordinates along axes $\vec{X}, \vec{Y}$. The method comprises:

receiving the seismic image, the seismic image having points associated with coordinates along axes $\vec{X}, \vec{Y}, \vec{Z}$;

receiving a plurality of related control points associated with coordinates on axes $\vec{X}, \vec{Y}, \vec{Z}$;

in a reference plane defined by axes $\vec{X}$ and $\vec{Y}$, defining, for at least one related control point among the plurality of related control points, an associated reference point with coordinates along axes $\vec{X}, \vec{Y}$, among a plurality of reference points, the reference point having coordinates on axes $\vec{X}$ and $\vec{Y}$ identical to coordinates on axes $\vec{X}$ and $\vec{Y}$ of the related control point, defining pseudo-rectangles in said reference plane, each pseudo-rectangle comprising a reference point among a plurality of reference points.

In a subsequent step, the invention consists in, for each current pseudo-rectangle among the defined pseudo-rectangles:

applying a diffeomorphic transformation F, the diffeomorphic transformation F:

being a function of coordinates along $\vec{X}, \vec{Y}$ and defining a new domain comprising axes $\vec{X'}, \vec{Y'}, \vec{Z}$;

transforming points of the seismic image having coordinates along axes $\vec{X}$, $\vec{Y}$ identical to coordinates along axes $\vec{X}$, $\vec{Y}$ of points in the current pseudo-rectangle, the points of the seismic image including the related control point associated with the current pseudo-rectangle;

transforming the current pseudo-rectangle into a corresponding rectangle;

applying a horizon reconstruction algorithm to the transformed points, to determine a part of a transformed horizon, the part of a transformed horizon comprising the transformed related control point, the reconstruction of the seismic horizon comprising solving the Poisson equation $\Delta(\delta\tau) = -\text{div}(r)$, where $\delta\tau$ is an unknown function of coordinates along axes $\vec{X'}$, $\vec{Y'}$, $\Delta$ denotes the Laplace operator in the new domain, div denotes the divergence vector operator in the new domain and r is a fixed function of coordinates along axes $\vec{X'}$, $\vec{Y'}$;

computing a part of the horizon, the computing of a part of the horizon comprising applying an inverse diffeomorphic transformation $F^{-1}$ to the determined part of a transformed horizon.

The term pseudo-rectangle is used to refer to any quadrangle or quadrilateral that has a convex shape, that is to say that each of its inner angles is smaller than 180°. Simple diffeomorphic transformations can be used to transform a convex quadrangle into a rectangle.

Axes $\vec{X}$, $\vec{Y}$, $\vec{Z}$ are used to define corresponding coordinates x, y and z for each point in the three-dimensional domain.

For the sake of clarity, any point belonging to the reference plane will be referred to using the adjective reference, e.g. a reference center, and the corresponding points on the seismic horizon having the same x and y coordinates will be referred to using the adjective related, e.g. a related central point.

One advantageous feature of the invention resides in the definition of pseudo-rectangles that delimit portions of the three-dimensional domain. Each of these portions has a pseudo-rectangular section and comprises points in the vicinity of a related control point. A horizon reconstruction algorithm is applied to the points of these portions of the three-dimensional domain. The combined volume of these portions, corresponding to the sum of all the volumes of the portions defined by pseudo-rectangles, may be smaller than the volume of the domain corresponding to the entire seismic image. This reduction in volume provides a first enhancement of the computational speed of the horizon reconstruction algorithm.

A second advantageous feature of the invention is that it provides fast means for solving the Poisson equation, the latter generally implementing an iterative algorithm within the horizon reconstruction algorithm. To do so, the invention introduces for each previously defined pseudo-rectangle, a corresponding diffeomorphic transformation F which transforms each pseudo-rectangle into a corresponding rectangle in a transformed reference plane defined by axes $\vec{X'}$ and $\vec{Y'}$. The same diffeomorphic transformation F also transforms the points of the corresponding portion of the three-dimensional domain into transformed points which are within a transformed portion of the three-dimensional domain delimited by the corresponding rectangle. The purpose of this transformation is to meet some conditions in which the Poisson equation can be solved in one step, i.e. using direct calculation techniques that do not rely on an iterative algorithm. It is known, by a man skilled in the art of solving Poisson equations on discrete systems, that at least two conditions can be met to enable such a fast computation:

the portion of the three-dimensional domain on which the equation is solved advantageously has a rectangular or circular section and, either at least one related control point belongs to the latter portion of the three-dimensional domain, this being also associated with specific conditions on the boundaries called Neumann condition, or the boundary conditions along the edges of the portion of the three-dimensional domain are known, the latter condition being also referred to as Dirichlet boundary condition.

In the invention, the diffeomorphic transformation of pseudo-rectangles into rectangles ensures that the first condition is met. The diffeomorphic transformation associated with a pseudo-rectangle is applied to all the points of the seismic image whose coordinates along axes $\vec{X}$ and $\vec{Y}$ match those of points in the pseudo-rectangle. The coordinates along axis $\vec{Z}$ are not affected by that transformation. The second condition is met by defining pseudo-rectangles that comprise reference points associated with related control points received as input and the coordinates of which are known.

Another original feature of the invention resides in the fact that each diffeomorphic transformation is applied to the portion of the seismic image comprising points having the same x and y coordinates as points in the pseudo-rectangles. Therefore, it may not be necessary to replace the Laplace operator of the Poisson equation by a differential operator with variable coefficients, which would render the resolution of the Poisson equation complex. In the invention, the divergence operator and the fixed function r are the ones that are transformed, thereby enabling the implementation of fast solvers and not necessarily matrix methods.

Finally, another original feature of this invention is the possibility of choosing pseudo-rectangles delimiting portions of the three-dimensional domain having any section suitable for encompassing the received related control points. This is particularly interesting in situations where the related control points are inhomogeneously scattered in the three-dimensional domain, with areas locally having higher concentrations of related control points. In such situations, defining a portion of the three-dimensional domain with a rectangular section may prove difficult insofar as it may require defining rectangles with small dimensions, sometimes referred to as degenerated rectangles. Horizon reconstruction algorithms might suffer from an insufficient number of data points in portions delimited by such degenerated rectangles and provide less accurate results. The use of pseudo-rectangles gives more freedom in choosing shapes adapted to the local distribution of related control points without suffering from the disadvantages that arise when defining portions of the three-dimensional domain delimited by rectangles.

More specifically, it may be advantageous that a pseudo-rectangle is defined so that the reference point comprised in a pseudo-rectangle belongs to a current reference edge of said pseudo-rectangle.

In this embodiment, the portion of a seismic horizon is determined by first determining the boundaries of the portion of the domain delimited by the current pseudo-rectangle. Having a reference point on a current reference edge may increase the efficiency of the algorithm by providing means for calculating these boundaries of the seismic horizon.

Indeed, when a reference point belongs to a current reference edge of a pseudo-rectangle, the associated related control point belongs to a related edge of the seismic horizon. It may then be possible to implement a calculation of the boundaries on the sought seismic horizon.

A further improvement of the method of the invention may consist in choosing advantageous methods for finding boundary conditions in the portion of the three-dimensional domain delimited by a pseudo-rectangle comprising reference points on a current reference edge.

To this end, prior to applying a diffeomorphic transformation F, the method may comprise applying, for each current pseudo-rectangle comprising a reference point belonging to a current reference edge of said pseudo-rectangle among the defined pseudo-rectangles, for each current reference edge of said current pseudo-rectangle, a horizon reconstruction algorithm to edge points having coordinates along axes $\vec{X}$, $\vec{Y}$ identical to the coordinates along axes $\vec{X}$, $\vec{Y}$ of reference edge points of said current reference edge.

The horizon reconstruction algorithm implemented to compute these boundary conditions may be a simplified algorithm insofar as its solutions are functions that can be graphically represented in two dimensions as lines. A first current reference edge may advantageously be chosen as being the one comprising the reference point associated with the related control point. A first horizon line comprising said related control point and forming a first related edge associated with reference edge points of the first current reference edge may be determined. The extremities of this first related edge may be used to determine, respectively, a second and third related edge, by implementing horizon reconstruction algorithms in a similar fashion on points of faces of the portion of the three-dimensional domain delimited by the current pseudo-rectangle associated with reference edge points of a second and third current reference edge. Two extremities of the second and third related edge may correspond to extremities of a fourth related edge. Therefore the fourth related edge may be determined by implementing a horizon reconstruction algorithm on edge points of a face associated with a fourth current reference edge, with the condition that the horizon line passes through both extremities of the fourth related edge.

It may be advantageous to perform the calculation of the boundaries prior to applying a diffeomorphic transformation to each pseudo-rectangle, insofar as some pseudo-rectangles and therefore, the portions of the three-dimensional domain that is delimited by these pseudo-rectangles, may share at least a portion of an edge. In this way, it may be possible to reduce the number of calculations that are performed to determine the boundary conditions by using the already calculated boundaries of portions of the three-dimensional domain delimited by adjacent pseudo-rectangles. It may however also be possible to perform these calculations individually for each pseudo-rectangle in the transformed domain after applying a diffeomorphic transformation F. In this alternative embodiment of the invention, it may be possible to use the corresponding inverse diffeomorphic transformation $F^{-1}$ to reuse the portions of boundaries that are identical for the portions of the three-dimensional domain delimited by two adjacent pseudo-rectangles.

Some techniques for defining pseudo-rectangles may be particularly advantageous, may further reduce the computation time of the algorithm, and may be easy to implement.

For instance, it may be possible to define pseudo-rectangles such that at least one reference corner of each pseudo-rectangle among the defined pseudo-rectangles may have coordinates along axes $\vec{X}$, $\vec{Y}$ identical to the coordinates along axes $\vec{X}$, $\vec{Y}$ of a related control point among the plurality of related control points.

In such an embodiment, each pseudo-rectangle among the defined pseudo-rectangles may have a reference corner associated with a related control point, thus enabling an easy calculation of the boundary conditions, for example by applying successive horizon reconstruction algorithms to points of faces of the portion of the three-dimensional domain comprising a reference edge comprising said corner and axis $\vec{Z}$.

In a particularly advantageous configuration, the received plurality of related control points may comprise at least three related control points, and defining pseudo-rectangles comprises:
  identifying reference points in the reference plane;
  identifying triangles having a first reference corner, a second reference corner and a third reference corner among the identified reference points using a triangulation, and in each of the identified triangles:
    identifying a reference centroid of said triangle,
    identifying a first reference center of the segment defined by the first reference corner and the second reference corner;
    identifying a second reference center of the segment defined by the first reference corner and the third reference corner;
wherein a pseudo-rectangle is defined by segments connecting the first reference corner with the first reference center, the first reference center with the reference centroid, the reference centroid with the second reference center and the second reference center with the first reference corner.

Such a method of defining pseudo-rectangles may provide several advantages. First of all, it can be easily implemented by a computer program, no matter the distribution of the related control points. Secondly, this method may optimize the size distribution of the pseudo-rectangles, since the area of the pseudo-rectangles that are part of a given triangle is substantially the same. Thirdly, this way of defining pseudo-rectangles may greatly facilitate the determination of boundary conditions, since a reference corner of each pseudo-rectangle is associated with a related control point, and the triangles define lines joining reference points. These lines enable an easy calculation of the corresponding horizon line by applying a horizon reconstruction algorithm to points of a plane comprising axis $\vec{Z}$ and two of the related control points.

More specifically, when pseudo-rectangles are defined in this way, the method of the invention may advantageously comprise, for an identified triangle, and prior to applying a diffeomorphic transformation F:
  identifying a first, second and third related control point among the plurality of related control points associated with corresponding first, second and third reference corners of said identified triangle;
  applying a horizon reconstruction algorithm to points of a plane comprising axis $\vec{Z}$ and comprising the first and second related control points to determine a first portion of a first local horizon;
  identifying a first related central point on the first portion of the first local horizon having coordinates along axes $\vec{X}$ and $\vec{Y}$ identical to coordinates along axes $\vec{X}$ and $\vec{Y}$ of the first reference center;

applying a horizon reconstruction algorithm to points of a plane comprising axis $\vec{Z}$ and comprising the first and third related control points to determine a second portion of a second local horizon;

identifying a second related central point on the second portion of the second local horizon having coordinates along axes $\vec{X}$ and $\vec{Y}$ identical to coordinates along axes $\vec{X}$ and $\vec{Y}$ of the second reference center;

computing a coordinate along axis $\vec{Z}$ of a related middle point having coordinates along axes $\vec{X}$ and $\vec{Y}$ identical to coordinates along axes $\vec{X}$ and $\vec{Y}$ of the reference centroid of said identified triangle, the computation of said coordinate along axis $\vec{Z}$ being a function of the coordinates of a point on said determined first or second local horizons.

More specifically, the computation of the z coordinate of the related middle point can be a function of any point belonging to the first or second local horizon. For example, it could advantageously be a function of one of the extremities of the first or second local horizons, or either related central point.

The method described above may benefit from one major advantage: it may be particularly efficient from a computational point of view because many steps are implemented once for a first identified triangle, but can be skipped when applying the method to points associated with adjacent triangles. This more specifically concerns the portions of local horizons joining two related control points associated with two reference corners of a triangle. These portions of local horizons may be shared by two adjacent portions of the three-dimensional domain delimited by two adjacent triangles.

It may be possible to compute the coordinates along axis $\vec{Z}$ of the related middle point of the identified triangle by applying a horizon reconstruction algorithm to points of a plane comprising axis $\vec{Z}$, and comprising the segment connecting the first reference center with the reference centroid or the segment connecting the second reference center with the reference centroid.

Doing so may increase the precision of the above mentioned method.

Alternatively, computing a coordinate along axis $\vec{Z}$ of the related middle point can also be achieved by calculating the mean value of the coordinates along axis $\vec{Z}$ of at least the first and second related central points.

This technique may be very quick and provide a good accuracy especially if the size of the triangle is small.

Several techniques may be foreseen to solve the Poisson equation that is computed in the horizon reconstruction algorithm. Once the conditions required for a one-step direct resolution of the equation are met, it may be advantageous to solve the Poisson equation using a Fourier transform algorithm.

The latter algorithms are well-known and easy to implement in a computer program for instance, due to the multitude of existing libraries for performing Fourier transforms on discrete data. Furthermore, Fourier transform algorithms are excellent alternatives to matrix methods, the latter being a lot more complex to compute.

The method described above can be implemented on portions of the three-dimensional domain comprising points having the same x and y coordinates as individualized pseudo-rectangles.

However it is possible to define pseudo-rectangles that map a continuous portion of the reference plane.

This may increase the computational speed of the method due to the fact that some of the computed data, for example the boundaries, can be reused on portions of the three-dimensional domain delimited by neighboring pseudo-rectangles.

In a final step, once two-dimensional portions of a horizon have been calculated for each of the defined pseudo-rectangles, the method may further comprise assembling all these portions of horizons to define a finalized portion of a reconstructed horizon.

To do so, the method may comprise computing a portion of a seismic horizon from at least the computed part of the horizon of each current pseudo-rectangle among the defined pseudo-rectangles.

When pseudo-rectangles were defined using a triangulation as described above, the method may further comprise computing a portion of a seismic horizon from at least the computed part of the horizon of each current pseudo-rectangle among the defined pseudo-rectangles, and after computing a portion of a seismic horizon, the method may comprise:

receiving modification information relating to the related control points;

identifying pseudo-rectangles affected by the received modification information relating to the related control points;

defining a new set of pseudo-rectangles in a local area corresponding to the area occupied by the pseudo-rectangles affected by said received modification information relating to the related control points;

for each current pseudo-rectangle among the new set of pseudo rectangles:

applying a diffeomorphic transformation F, said diffeomorphic transformation F:

being a function of coordinates along $\vec{X}$, $\vec{Y}$ and defining a new domain comprising axes $\vec{X'}$, $\vec{Y'}$, $\vec{Z}$;

transforming points of the seismic image having coordinates along axes $\vec{X}$, $\vec{Y}$ identical to coordinates along axes $\vec{X}$, $\vec{Y}$ of points in said current pseudo-rectangle, said points of the seismic image including the related control point associated with the current pseudo-rectangle;

transforming said current pseudo-rectangle into a corresponding rectangle;

applying a horizon reconstruction algorithm to the transformed points, to determine a part of a transformed horizon, said part of a transformed horizon comprising the transformed related control point, the reconstruction of the seismic horizon comprising solving the Poisson equation $\Delta(\delta\tau)=-\text{div}(r)$, where $\delta\tau$ is an unknown function of coordinates along axes $\vec{X'}$, $\vec{Y'}$, $\Delta$ denotes the Laplace operator in the new domain, div denotes the divergence vector operator in the new domain and r is a fixed function of coordinates along axes $\vec{X'}$, $\vec{Y'}$;

computing a part of the horizon, said computing of a part of the horizon comprising applying an inverse diffeomorphic transformation $F^{-1}$ to the determined part of a transformed horizon.

Therefore, whenever new related control points are added, or former related control points are removed, the method can efficiently limit the portion of the three-dimensional domain on which new calculations are performed to the portion of the three-dimensional domain concerned by the modifications that were performed.

The invention also pertains to a device for enhancing the determination, from a seismic image, of at least a portion of a seismic horizon in a three-dimensional domain comprising axes $\vec{X}$, $\vec{Y}$, $\vec{Z}$, said seismic horizon being a function of coordinates along axes $\vec{X}$, $\vec{Y}$ in said three-dimensional domain,
wherein said device comprises:
an input interface for receiving the seismic image, the seismic image having points associated with coordinates along axes $\vec{X}$, $\vec{Y}$, $\vec{Z}$; and for receiving a plurality of related control points associated with coordinates on axes $\vec{X}$, $\vec{Y}$, $\vec{Z}$;
a circuit for defining, in a reference plane defined by axes $\vec{X}$ and $\vec{Y}$, for at least one related control point among the plurality of related control points, an associated reference point with coordinates along axes $\vec{X}$, $\vec{Y}$, among a plurality of reference points, the reference point having coordinates on axes $\vec{X}$ and $\vec{Y}$ identical to coordinates on axes $\vec{X}$ and $\vec{Y}$ of the related control point,
a circuit for defining pseudo-rectangles in the reference plane, each pseudo-rectangle comprising a reference point among a plurality of reference points;
a circuit being adapted for, for each current pseudo-rectangle among the defined pseudo-rectangles:
applying a diffeomorphic transformation F, said diffeomorphic transformation F:
being a function of coordinates along $\vec{X}$, $\vec{Y}$ and defining a new domain comprising axes $\vec{X'}$, $\vec{Y'}$, $\vec{Z}$;
transforming points of the seismic image having coordinates along axes $\vec{X}$, $\vec{Y}$ identical to coordinates along axes $\vec{X}$, $\vec{Y}$ of points in said current pseudo-rectangle, said points of the seismic image including the related control point associated with the current pseudo-rectangle;
transforming said current pseudo-rectangle into a corresponding rectangle;
applying a horizon reconstruction algorithm to the transformed points, to determine a part of a transformed horizon, said part of a transformed horizon comprising the transformed related control point, the reconstruction of the seismic horizon comprising solving the Poisson equation $\Delta(\delta\tau)=-\text{div}(r)$, where $\delta\tau$ is an unknown function of coordinates along axes $\vec{X'}$, $\vec{Y'}$, $\Delta$ denotes the Laplace operator in the new domain, div denotes the divergence vector operator in the new domain and r is a fixed function of coordinates along axes $\vec{X'}$, $\vec{Y'}$;
computing a part of the horizon, said computing of a part of the horizon comprising applying an inverse diffeomorphic transformation $F^{-1}$ to the determined part of a transformed horizon.

The invention also pertains to a non-transitory computer readable storage medium, having stored thereon a computer program comprising program instructions, the computer program being loadable into a data-processing unit and adapted to cause the data-processing unit to carry out the sequence of operations of the method described above when the computer program is run by the data-processing device.

BRIEF DESCRIPTION OF THE DRAWINGS

The method of the invention will be better understood by reading the detailed description of exemplary embodiments presented below. These embodiments are illustrative and by no means limitative. They are provided with the appended figures and drawings on which.

For the sake of clarity, the dimensions of features represented on these figures may not necessarily correspond to the real-size proportions of the corresponding elements. Like reference numerals on the figures correspond to similar elements or items.

DETAILED DESCRIPTION OF THE INVENTION

Figure 1:
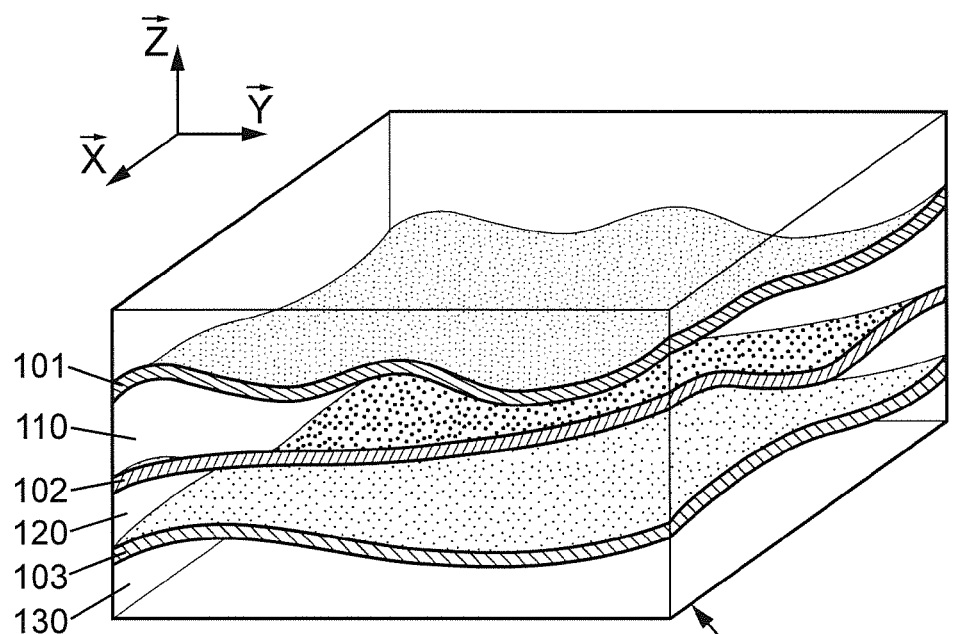
FIG. 1 is a schematic representation of a seismic image in a three-dimensional domain.

FIG. 1 represents an exemplary seismic image in a three-dimensional domain 1 associated with axes $\vec{X}$, $\vec{Y}$, $\vec{Z}$. Such an image comprises dark regions 101, 102, 103 alternating with brighter regions 110, 120, 130. From the data contained in the seismic image of FIG. 1, geophysicists may extract the tangent of the local dip p associated with every data point of the seismic image. The tangent of the local dip is expressed as a function of class $C^1$ of x, y, z coordinates. The aim of a horizon reconstruction method is to find a two-dimensional surface in the three-dimensional domain 1, that can be numerically represented as a function of class $C^2$:

$$\tau:(x,y)\rightarrow\tau(x,y)$$

of x, y coordinates and verifying the condition:

$$\tau = \underset{f \in C^2}{\operatorname{argmin}} \int_\Omega \|\nabla f(x; y) - p[x; y; f(x; y)]\|^2 d\Omega$$

where ∥ ∥ denotes a norm, for example the absolute value, ∇ denotes the gradient operator and Ω the portion of the three-dimensional domain 1 on which the seismic horizon is calculated. Iterative horizon reconstruction algorithms to solve the above equation are well-known from the existing prior art, such as for example from the above-cited article by Lomask et al.

In the process of implementing a horizon reconstruction algorithm, one constraint resides in the fact that any calculated horizon must pass through all the related control points received as input.

Several key steps are implemented in such an algorithm. Generally, a first horizon corresponding to a function $\tau=\tau_0$ is initialized. Then, a residual term r is calculated. This term r is another function of coordinates x, y, verifying the condition $r(x; y)=\nabla\tau(x; y)-p[x; y; \tau(x; y)]$, which corresponds to the difference between the tangent of the local dip of the seismic image and the gradient of the horizon.

While implementing the iterative horizon reconstruction algorithm, the main challenge resides in minimizing this residual term r. This is done by progressively correcting function τ, so that after each step k of the horizon reconstruction algorithm, $\tau_{k+1}=\tau_k+\delta\tau_k$. At each step, an update term δτ is computed, the latter verifying:

$$\delta\tau = \underset{f \in C^2}{\operatorname{argmin}} \int_\Omega \|\nabla f(x; y) + r(x; y)\|^2 d\Omega$$

This update term, later added to function τ, is numerically obtained by solving the Poisson equation:

Δ(δτ)=−div(r)

As mentioned above, the invention resides in the way this Poisson equation is calculated.

Figure 2:
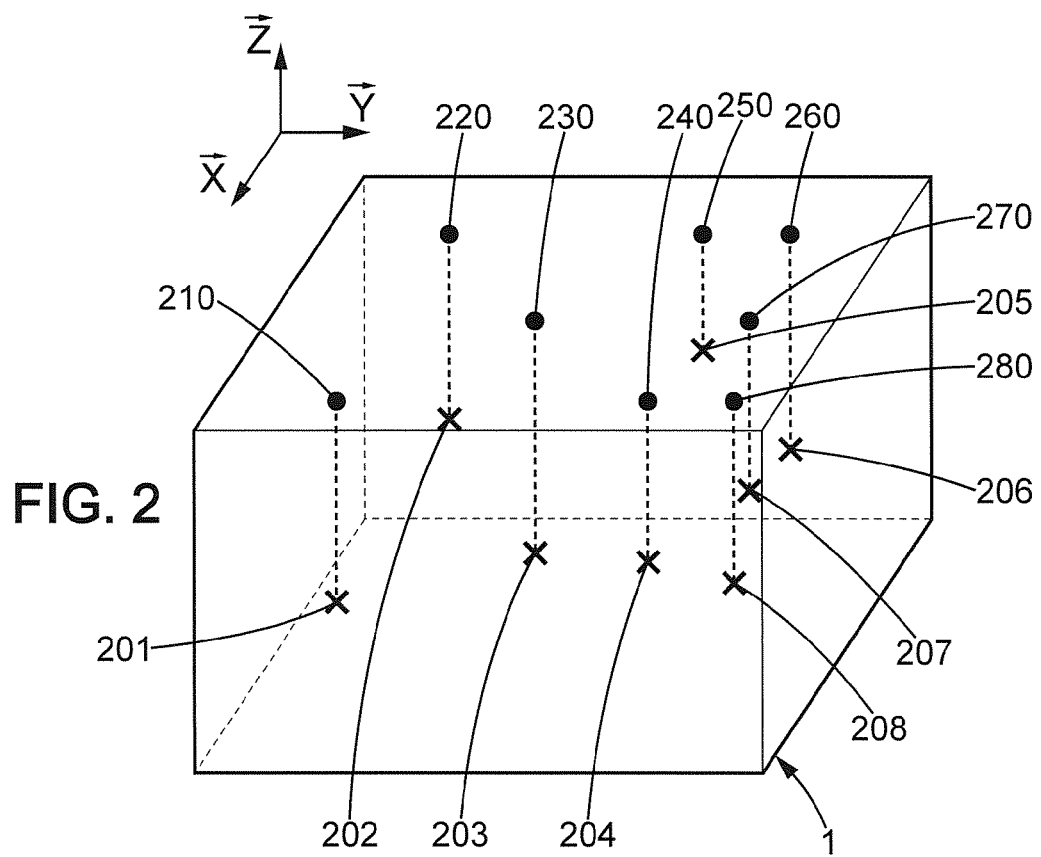
FIG. 2 is a schematic representation of the three-dimensional domain of FIG. 1 comprising related control points and their associated reference points in the reference plane.

As illustrated on FIG. 2, the method comprises receiving related control points 201, 202, 203, 204, 205, 206, 207, 208 in the three-dimensional domain 1. These related control points 201, 202, 203, 204, 205, 206, 207, 208 may for example be points that are known to belong to a given horizon because of drills realized in the ground or because of reliable geological data. The horizon reconstruction algorithm relies on using the x and y coordinates of the points of the three-dimensional domain 1 as input, and calculating a corresponding coordinate along axis $\vec{Z}$ to determine a reconstructed horizon. The method of the invention involves transformations on these points, that only affect their x and y coordinates, but do not change their z coordinate. To simplify the process of defining pseudo-rectangles and diffeomorphic transformations that are part of this invention, reference points 210, 220, 230, 240, 250, 260, 270, 280 associated with said related control points are defined in a reference plane 10, this reference plane being defined by axes $\vec{X}$ and $\vec{Y}$. The reference points 210, 220, 230, 240, 250, 260, 270, 280 have the same x and y coordinates along axes $\vec{X}$ and $\vec{Y}$ as the related control points 201, 202, 203, 204, 205, 206, 207, 208 i.e. the point 210 (respectively 220, 230, 240, 250, 260, 270, 280) is a projection of the related control point 201 (respectively 202, 203, 204, 205, 206, 207, 208) on a plane surface ($\vec{X}$, $\vec{Y}$).

Figure 3:
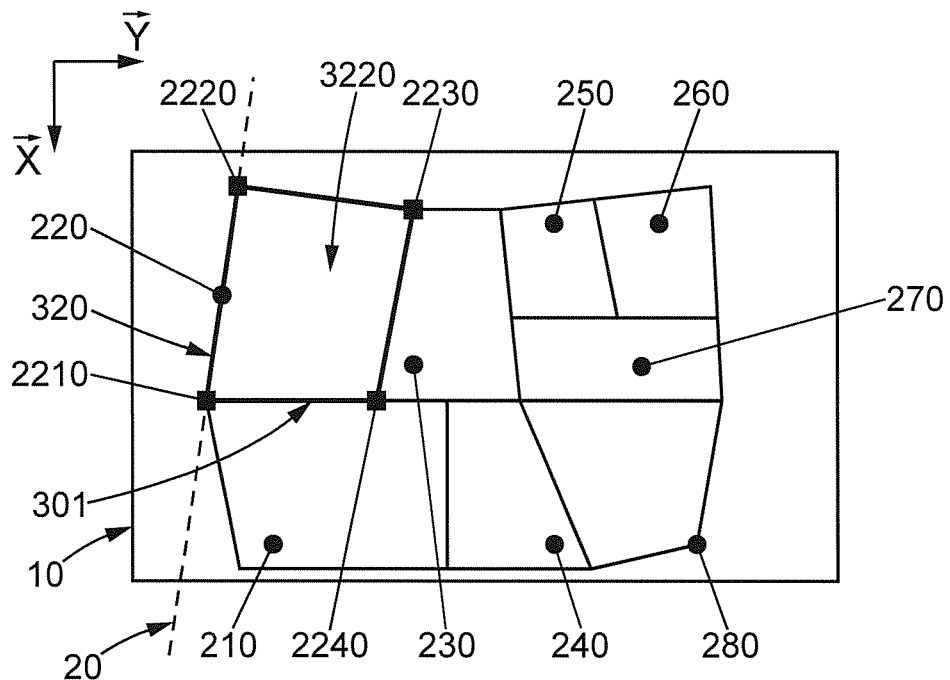
FIG. 3 is a schematic representation of the reference plane of FIG. 2.

As illustrated on FIG. 3, the invention then consists in defining pseudo-rectangles in the reference plane 10 comprising the reference points 210, 220, 230, 240, 250, 260, 270, 280 associated with related control points. This may be done in many different ways, some of which are illustrated on FIGS. 3, 9 and 10. On FIG. 3, pseudo-rectangles with random shapes map a portion of the reference plane 10. Each of these pseudo-rectangles contains one of the reference points 210, 220, 230, 240, 250, 260, 270, 280. The latter points can be located anywhere on a current pseudo-rectangle. For example, reference point 280 belongs to a reference corner of a current pseudo-rectangle, and reference point 220 belongs to a current reference edge of a current pseudo-rectangle 3220.

The pseudo-rectangles comprising reference points 210, 220, 230, 240, 250, 260, 270, 280 verify the boundary conditions called Neumann conditions, which state that for a unique point of fixed coordinates on the horizon, the derivative of the update term along the exterior normal $\vec{\omega}$ to the boundary is assumed to be equal to zero and its mean value fixed to zero. In other words, for any value of coordinates x and y along the edges of the horizon in the portion Ω of the three-dimensional domain 1 delimited by the current pseudo-rectangle, the following scalar product is equal to zero: $\nabla\delta\tau$ (x; y)·$\vec{\omega}$ (x;y)=0. In such pseudo-rectangles, it is advantageous to avoid calculating the boundary conditions since these boundaries are not required to rapidly solve the horizon reconstruction algorithm. It may also be advantageous to verify that adjacent calculated portions of a seismic horizon form a continuous surface, and implement corrections to ensure that there is no discontinuity at their shared boundary.

In another embodiment, it may be advantageous to compute the boundary conditions on the edges of the horizon in the portion Ω of the three-dimensional domain 1 delimited by the current pseudo-rectangle, to verify the Dirichlet conditions and in order to be sure that the different determined horizons for each pseudo-rectangle are continuous. On FIG. 3, a plane 20 defined by axis $\vec{Z}$ and containing reference point 220 and reference corners 2220, 2210 is represented. This plane 20 comprises the current reference edge 320 of the current pseudo-rectangle 3220. On FIG. 3, this plane 20 appears as a line.

Figure 4:
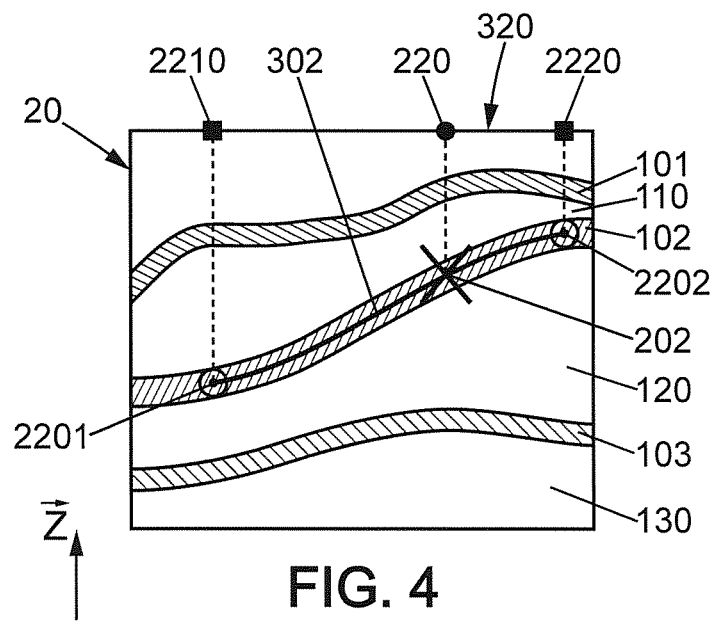
FIG. 4 is a schematic representation of a plane pointed at on FIG. 3 and comprising axis $\vec{Z}$, a portion of seismic image, a current reference edge of a pseudo-rectangle and a related control point associated with a reference point on the current reference edge.

On FIG. 4, the same plane 20 is represented with the points from the seismic image having the same coordinates in the three-dimensional domain 1 as points from the plane 20, reference point 220, the related control point 202, and the reference corners 2220, 2210. To find the related edge 302 comprising related control point 202 and belonging to the seismic horizon, a horizon reconstruction algorithm can be applied to points of plane 20. This horizon reconstruction algorithm is easier to implement since it resolves the Poisson equation in two-dimensions, that is to say, it computes a function T which can be expressed as a function of one variable and which can be graphically represented in a plane. As can be seen on FIG. 4, the reconstructed horizon line 302 tends to follow the tangent of the dip of the points from the seismic image.

Figure 5:
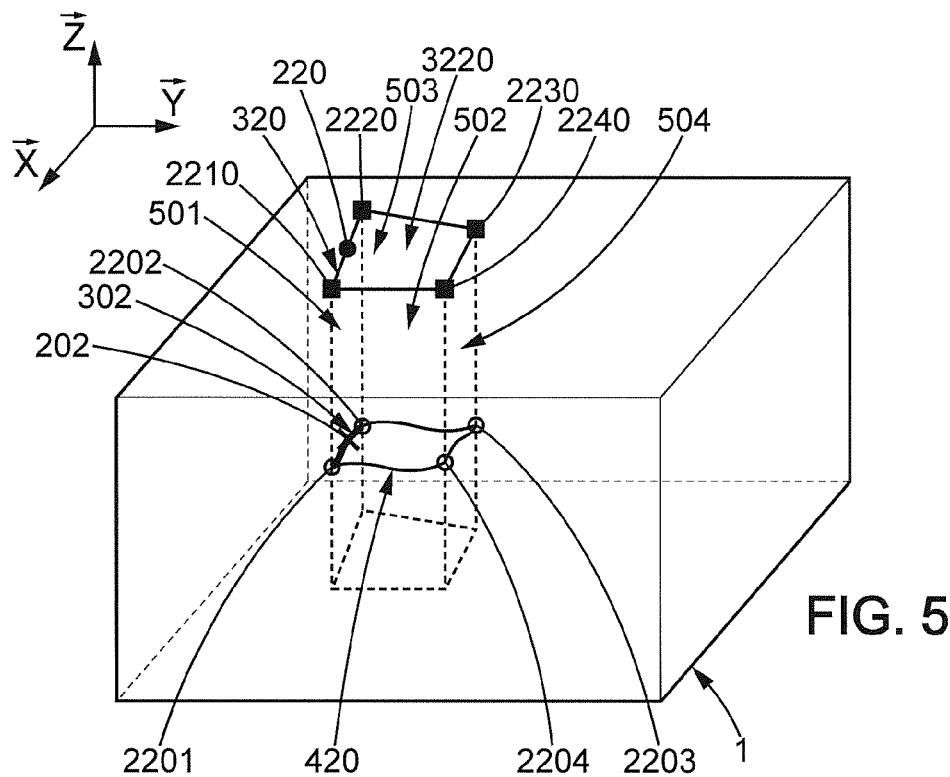
FIG. 5 is a schematic representation of the three-dimensional domain of FIG. 1 comprising one related control point the associated current pseudo-rectangle and the boundaries of the sought seismic horizon delimited by the current pseudo-rectangle.

The boundaries of the sought horizon are represented on FIG. 5. FIG. 5 represents the portion of the three-dimensional domain 1 delimited by pseudo-rectangle 3220. This portion comprises four faces: face 501 appears on the left side, face 504 on the right side, face 502 at the back and face 503 at the front of the illustration on FIG. 5. Knowing a related edge 302, corresponding to a horizon line of the sought horizon, comprised in face 501, it is possible to compute the boundaries 420. The horizon line 302 can be used to compute the other horizon lines along the adjacent faces 502, 503 of the current portion of the three-dimensional domain 1 delimited by the current pseudo-rectangle 3220. To do so, the extremities 2201 and 2202 of the horizon line are used in two horizon reconstruction algorithms to determine a second and third horizon lines. The second horizon line passes through extremity 2202, comprises another extremity 2203 and is comprised in face 502. The third horizon line passes through extremity 2201, comprises another extremity 2204 and is comprised in face 503. The horizon line comprised in the remaining face 504 is determined by applying a horizon reconstruction algorithm to points of the remaining face 504, so that the horizon line passes through extremities 2203 of the second and 2204 third horizon line.

This step by step approach leads to the determination of the boundary conditions in the portion Ω of the three-dimensional domain 1 delimited by the current pseudo-rectangle, thereby fulfilling the Dirichlet boundary conditions. FIG. 5 illustrates the determined boundaries 420 in the current portion Ω of the three-dimensional domain 1 delimited by the current pseudo-rectangle associated with related control point 202.

It is to be noted that although the above description and illustrations describe a way of determining the boundary conditions in the current portion Ω, it is possible to skip this step and proceed with the method described below. Indeed, the method of this invention is also efficient in the case where a single related control point is contained in the current portion Ω. Alternatives such as the configuration in which a related control point has the same x and y coordinates as a reference corner of the current pseudo-rectangle, as is the case for related control point 208, is also compatible with the invention. As long as any one of the boundary conditions is met, the method of the invention further proceeds by identifying, for a current pseudo-rectangle, a diffeomorphic transformation F which transforms the current pseudo-rectangle into a corresponding rectangle. For a current pseudo-rectangle, such a diffeomorphic transformation F is a function which transforms coordinates (x;y) into corresponding coordinates (x',y') so that:

$$\begin{bmatrix} x' \\ y' \end{bmatrix} = F(x; y) = \begin{bmatrix} F_{x'}(x; y) \\ F_{y'}(x; y) \end{bmatrix}$$

Figure 6:
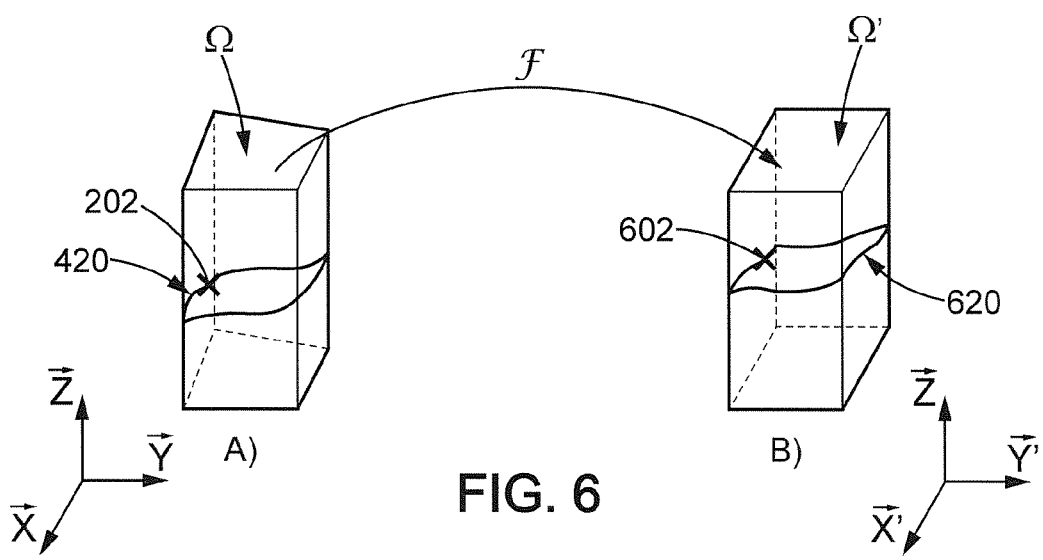
FIG. 6 presents schematic representations (A and B) of the transformation operated by the diffeomorphic transformation F associated with the pseudo-rectangle of FIG. 5.

FIG. 6 (element A) illustrates a current portion Ω of the three-dimensional domain 1 delimited by the current pseudo-rectangle associated with related control point 202, for which the Dirichlet conditions, represented by boundaries 420, have been computed. All the points of this current portion Ω are transformed using diffeomorphic transformation F to obtain the corresponding rectangle and the new domain Ω' delimited by the corresponding rectangle illustrated on FIG. 6 element B. The boundary conditions 620 in the new domain as well the transformed related control point 602 are also represented.

The new domain is associated with the transformed axes $\vec{X'}$, $\vec{Y'}$, $\vec{Z}$. In addition to transforming the current portion Ω into the new domain Ω', the method of the invention also transforms the corresponding portion of the seismic image, to obtain a set of transformed points in the new domain. The gradient field of the function τ is therefore relied on a vector field by a partial differential equation:

$$\nabla \tau(x'; y') = p'[x'; y'; \tau(x'; y')]$$

where p' is the tangent of the transformed local dip p. It can be expressed as:

$$p' = J_F^{-1} p$$

where $J_F^{-1}$ is the inverse of the transformation Jacobian matrix $J_F$ defined by:

$$J_F = \begin{bmatrix} \dfrac{\partial x'}{\partial x} & \dfrac{\partial y'}{\partial x} \\ \dfrac{\partial x'}{\partial y} & \dfrac{\partial y'}{\partial y} \end{bmatrix}$$

The diffeomorphic transformation F transforming a current pseudo-rectangle into a corresponding rectangle is a homography defined by a 3×3 matrix $H=[h_{ij}]$. This transformation is given, for any x, y coordinates in the current portion Ω by:

$$\begin{bmatrix} x' \\ y' \end{bmatrix} = \begin{bmatrix} \dfrac{h_{11}x + h_{12}y + h_{13}}{h_{31}x + h_{32}y + h_{33}} \\ \dfrac{h_{21}x + h_{22}y + h_{23}}{h_{31}x + h_{32}y + h_{33}} \end{bmatrix}$$

The four terms of the Jacobian are then defined by:

$$\dfrac{\partial x'}{\partial x}(x; y) = \dfrac{(h_{11}h_{32} - h_{31}h_{12})y + h_{11}h_{33} - h_{31}h_{13}}{(h_{31}x + h_{32}y + h_{33})^2}$$

$$\dfrac{\partial y'}{\partial x}(x; y) = \dfrac{(h_{21}h_{32} - h_{31}h_{22})y + h_{21}h_{33} - h_{32}h_{23}}{(h_{31}x + h_{32}y + h_{33})^2}$$

$$\dfrac{\partial x'}{\partial y}(x; y) = \dfrac{(h_{12}h_{31} - h_{31}h_{121})x + h_{21}h_{33} - h_{31}h_{23}}{(h_{31}x + h_{32}y + h_{33})^2}$$

$$\dfrac{\partial y'}{\partial y}(x; y) = \dfrac{(h_{22}h_{31} - h_{32}h_{21})x + h_{22}h_{33} - h_{31}h_{23}}{(h_{31}x + h_{32}y + h_{33})^2}$$

It is therefore possible to compute, for each point of the new domain, a transformed residual term r and solve the Poisson equation in the transformed domain.

With the elements obtained so far, two conditions are met to allow a direct and one-step resolution of the Poisson equation: the domain on which a solution is searched corresponds to points having x and y coordinates identical to those of a rectangle, and either at least one related control point is within this new domain, or the boundary conditions of the solution are known.

The determination of the update term, the solution of the Poisson equation, can be calculated using fast Fourier transform algorithms, for example by solving the equation:

$$\delta \tau = FT^{-1}\left[\dfrac{FT[-div(r)]}{FT[\Delta]}\right]$$

where FT denotes a Fourier transform and $FT^{-1}$ denotes an inverse Fourier transform.

Advantageously, the Fourier transform is a discrete Fourier transform, and even more advantageously a fast Fourier transform. If the size of the new domain can be expressed as a number verifying $2^a 3^b 5^c 7^d 11^e 13^f$, where a, b, c, d, e and f are positive integers and e+f is smaller than 1, then a particularly efficient fast Fourier transform can be implemented to further reduce the computation time of the method of the invention.

Figure 7:
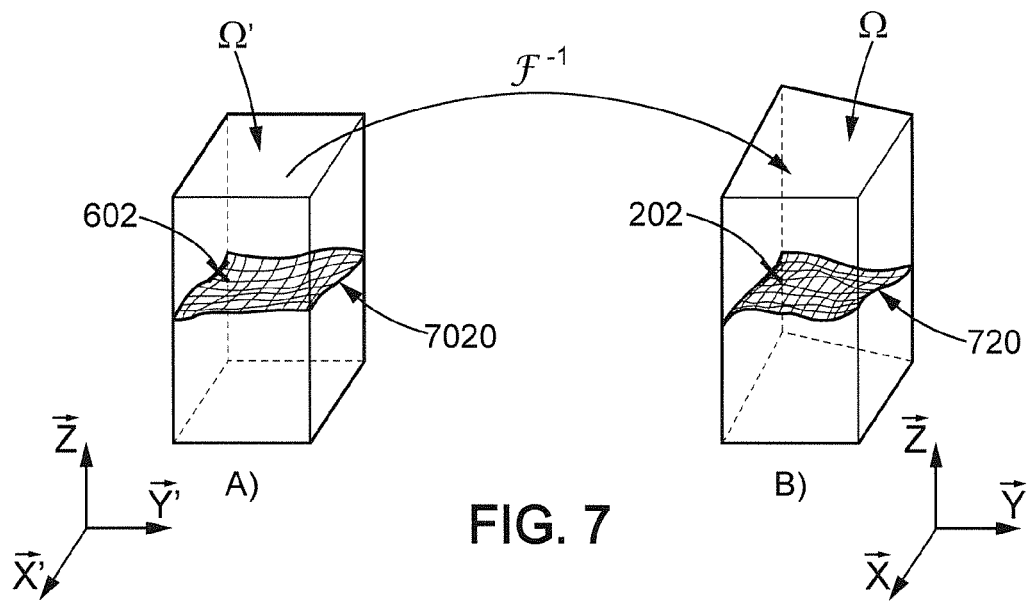
FIG. 7 presents schematic representations (A and B) of the transformation operated by the inverse diffeomorphic transformation $F^{-1}$ associated with the pseudo-rectangle of FIGS. 5, 6 element A and 6 element B.

As represented on FIG. 7 element A, once the transformed part of a reconstructed horizon 7020 is obtained, the method comprises applying the inverse diffeomorphic transformation $F^{-1}$ to the transformed part of a reconstructed horizon to obtain a part of a reconstructed horizon 720, as represented on FIG. 7 element B.

Figure 8:
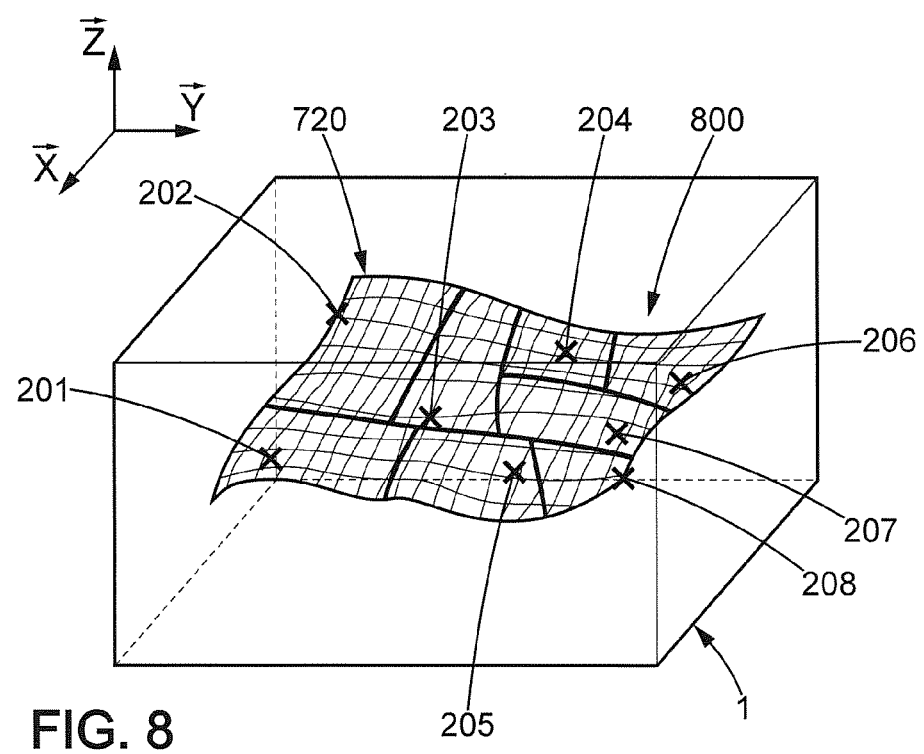
FIG. 8 is a schematic representation of the three-dimensional domain of FIG. 1 comprising related control points and their associated portions of a reconstructed seismic horizon.

Finally, the invention advantageously comprises assembling all the parts of a reconstructed horizon to obtain a reconstructed horizon on a portion of the three-dimensional domain 1 as represented on FIG. 8.

Besides the general method described above, the invention may advantageously benefit from substantial optimizations that allow it to be performed faster and be easily programmed to be executed with minimal input from the user.

Figure 9:
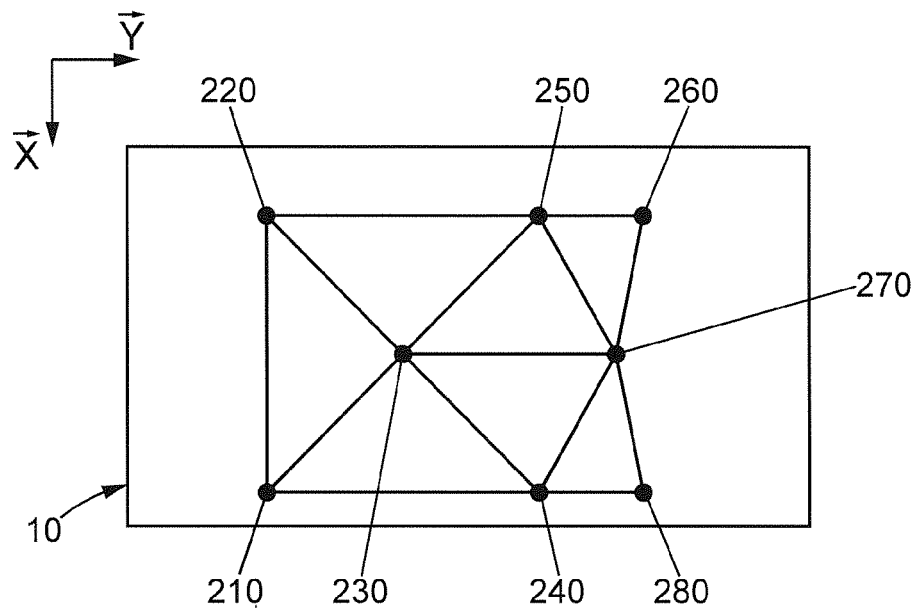
FIG. 9 is a schematic representation of the reference plane of FIG. 2 according to a second embodiment.

To this end, FIG. 9 represents a method for defining pseudo-rectangles that have a substantially similar shape and which allows a fast and reliable calculation of the boundary conditions in each pseudo-rectangle.

Figure 10:
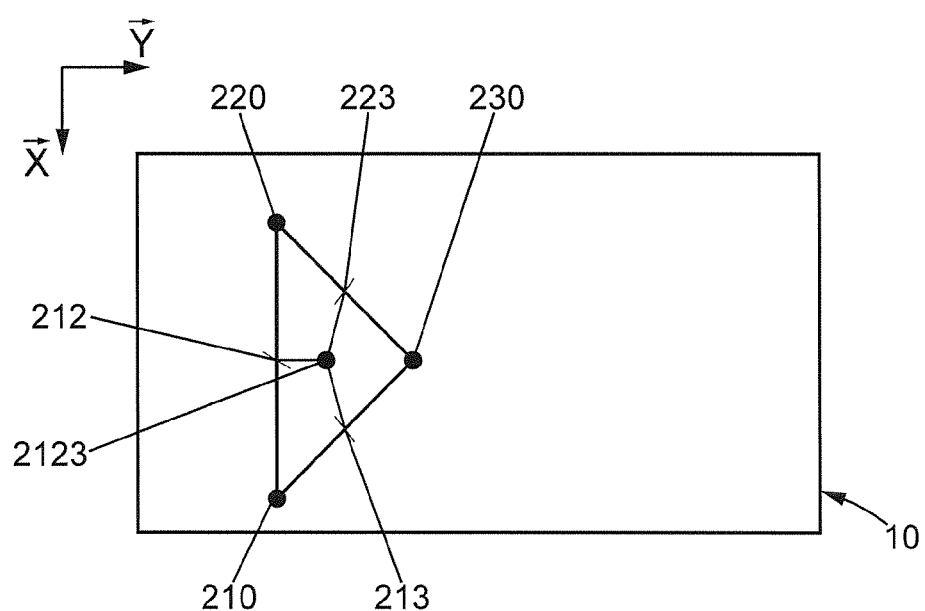
FIG. 10 is a schematic representation of the reference plane of FIG. 9 with three pseudo-rectangles defined in accordance with the second embodiment.

On FIG. 9 reference points 210, 220, 230, 240, 250, 260, 270, 280 associated with related control points 201, 202, 203, 204, 205, 206, 207, 208 are represented in the reference plane 10. A triangulation, advantageously a Delaunay triangulation, connecting all these reference points to form triangles is implemented. Then, as represented on FIG. 10, the center of each side of an identified triangle is selected. FIG. 10 represents the triangle identified by corners corresponding to reference points 210, 220 and 230. The reference centers 223, 212 and 213 of the sides of this triangle are also used to determine the centroid 2123 of this triangle, the centroid being the point where the median lines of the triangle cross. In this manner, the obtained three pseudo-rectangles have substantially the same area in each triangle, and the method can systematically be implemented by a computer program.

Other advantages arise from the method of defining pseudo-rectangles represented on [[f]] FIGS. 9 and 10. The sides of each triangle are lines joining two reference points having the same x and y coordinates as related control points, and boundary conditions can be easily computed in the plane comprising axis $\vec{Z}$ and comprising two related control points by using a horizon reconstruction algorithm to obtain a horizon line. Since it may occur, as seen on FIG. 9, that several triangles share a common side, the calculation of boundary conditions may not have to be computed for each triangle in the portion of the three-dimensional domain 1 delimited by a triangle. Indeed the results obtained in the portion of the three-dimensional domain 1 delimited by a previously identified triangle may be reused in the portion of the three-dimensional domain 1 delimited by subsequent triangles.

The centroid of each triangle, called reference centroid 2123, shares the same x and y coordinates as a related middle point of the horizon. This related middle point is shared by three portions of horizon in three adjacent portions of the three-dimensional domain 1. There are several options for determining the z coordinate of that middle point of the horizon.

It is for example possible to make realistic approximations that are likely to be valid for triangles having a small area compared to the size of the three-dimensional domain 1. One of these consists in calculating the mean value of the z coordinate of related central points of the horizon, associated with reference centers 212, 223, 213 of at least two of the three sides of a current triangle. Another consists in assuming the z coordinate of that related middle point is equal to the z coordinate of any related point of the horizon associated with a reference point of the triangle, for example a reference corner 220, 230, 210 or a reference center 212, 223, 213 of a side of the triangle. Another method consists in applying a horizon reconstruction algorithm to points of the plane comprising axis $\vec{Z}$ and comprising one of the segments connecting a reference center 212, 223, 213 of a side of the triangle, and the reference centroid 2123, to obtain a horizon line.

In an alternative embodiment, it is possible to define pseudo-rectangles by combining the identified triangles two by two. Two adjacent triangles are combined by removing the segment they have in common. This embodiment is advantageous in that it makes it even easier to determine the boundary conditions of the portion Ω of the three-dimensional domain 1 delimited by a pseudo-rectangle, since every reference corner of each pseudo-rectangle is associated with a related control point. In this embodiment, horizon lines passing through the related control points define the boundary conditions of each pseudo-rectangle.

The method of the invention nonetheless also offers another major advantage over the existing prior art. Indeed, it is very efficient for computing portions of a seismic horizon when a related control point is added to or removed from a set of related control points.

Figure 11:
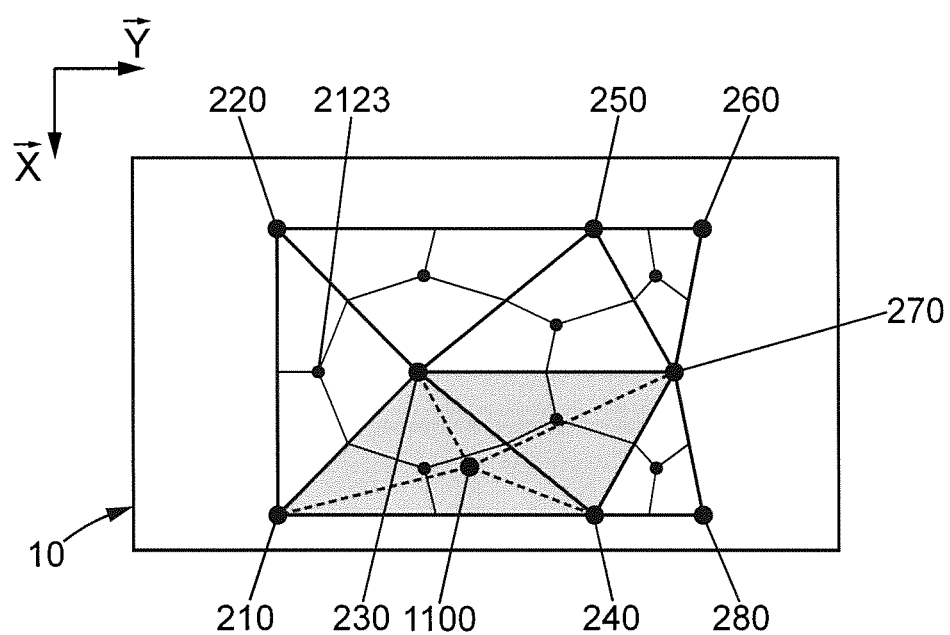
FIG. 11 is a schematic representation of the reference plane of FIG. 9 illustrating the pseudo-rectangles affected by the addition of a related control point.

FIG. 11 represents reference plane 10 containing reference points 210, 220, 230, 240, 250, 260, 270, 280 associated with related control points 201, 202, 203, 204, 205, 206, 207, 208. First, modification information relating to the related control points is received, for example the addition of a related control point. Then, the reference point 1100 in the reference plane 10 associated with the added related control point requires locally redefining pseudo-rectangles. Nevertheless, the effect is only local as shown on FIG. 11, on which the darkest pseudo-rectangles correspond to the affected area that is chosen for a recalculation of the local horizon. In general, adding a related control point only affects the pseudo-rectangle or pseudo-rectangles to which the added reference point associated with the added related control point belongs. Nevertheless, it is advantageous to identify an affected area by identifying the triangle or triangles to which the reference point belongs. This may enable defining new pseudo-rectangles having substantially the same size as already defined surrounding pseudo-rectangles. Since the pseudo-rectangles comprising the added reference point may share boundaries with neighboring pseudo-rectangles, two of which may belong to neighboring triangles, it is advantageous to include these neighboring triangles into the affected area and triangulate a new set of pseudo-rectangles on this affected area. On FIG. 11, the area affected by the addition of reference point 1100 implies a new triangulation giving rise to twelve new pseudo-rectangles. Similar conclusions arise when a related control point is removed.

For the above reason, the invention is very efficient in terms of computation time required to determine a horizon, for example when a user decides to add several related control points in a portion of the three-dimensional domain 1 which requires a finer resolution in the reconstructed horizon.

Figure 12:
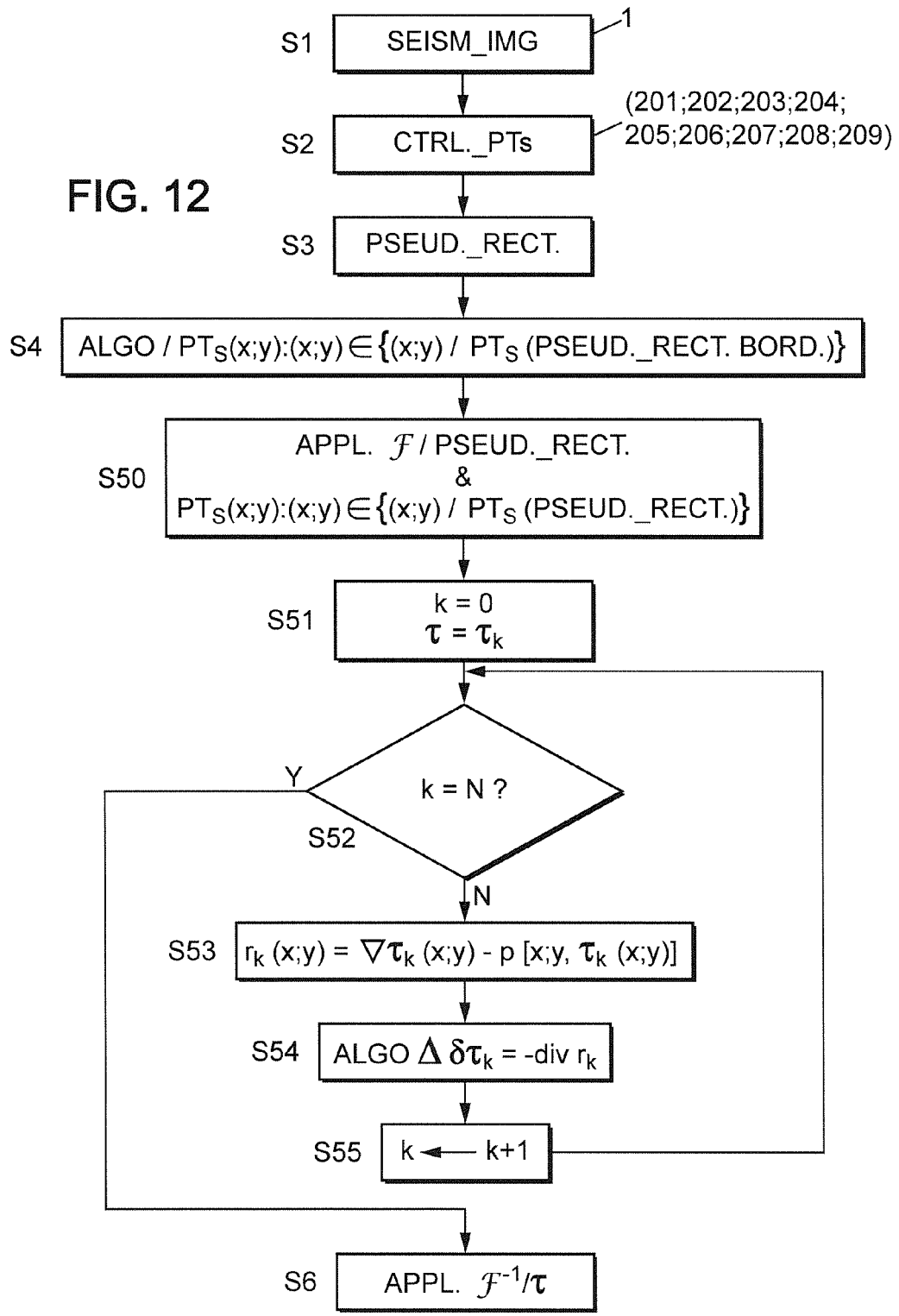
FIG. 12 is a flow chart illustrating the main steps implemented by the horizon reconstruction method.

FIG. 12 is a flow-chart schematically illustrating the different steps that are implemented by the method of this invention.

In a first step S1, a seismic image SEISM_IMG 1 is received. The seismic image 1 can for example be received from a raw seismic data treatment program that outputs the data points in the three-dimensional domain 1.

In a second step S2, related control points CTRL._PTs 201, 202, 203, 204, 205, 206, 207, 208 are received. The x, y, z coordinates of these points are fixed and they all belong to the same horizon.

In a subsequent step S3, pseudo-rectangles PSEUD._RECT. are defined, in such a way that each pseudo-rectangle is in a reference plane and comprises at least one reference point 210, 220, 230, 240, 250, 260, 270, 280.

In step S4, it is possible to apply, for each pseudo-rectangle PSEUD._RECT. one or several horizon reconstruction algorithms to points of an edge of a portion of the three-dimensional domain 1 delimited by the current pseudo-rectangle, in order to find the boundaries 420.

In step S50, a diffeomorphic transformation F is identified for each pseudo-rectangle. An identified diffeomorphic transformation F is applied to a current pseudo-rectangle to transform it into a corresponding rectangle. By doing so, the method generates conditions in which solving the Poisson equation can be greatly simplified.

Step S50 also comprises applying said transformation to the points of the seismic image having the same x and y coordinates as points of the pseudo-rectangle.

The invention further comprises the horizon reconstruction algorithm per se. It starts with step S51 which comprises identifying a horizon corresponding to an initialization function $\tau_k$ at k=0 and proceeding iteratively as follows:

comparing the number of iterations to a preset value N. It is assumed that the calculated horizon converges to a reliable solution typically after a few tens of iterations. In case the number of iterations is smaller than the preset value N, the method proceeds by;

computing a residual term $r_k$ using the horizon $\tau_k$ and the tangent of the transformed local dip p at step S54;

applying a horizon reconstruction algorithm using Fourier transforms to solve the Poisson equation in the new domain $\Omega'$ at step S54;

incrementing k by one digit at step S55 and returning to step S52. When the number k of iterations reaches the target value N, the method proceeds with step S6 by applying the inverse diffeomorphic transformation $F^{-1}$ that can transform the corresponding rectangle into the current pseudo-rectangle, to the computed horizon $\tau_k$.

Finally, all the portions of a reconstructed horizon obtained for each pseudo-rectangle can be assembled to form the portion of a reconstructed horizon represented on FIG. 8.

A comparison of the method of the invention and the global optimization method disclosed by Lomask et al. was performed on real seismic data defining a volume of 1750 m by 4000 m by 1600 m. Complex geometries and convergent structures of the treated data resulted in an extremely noisy estimated dip, so a set of twenty seven related control points were sequentially received in critical regions corresponding for example to peaks or basins of the horizon to be reconstructed, starting from an initial set of thirteen related control points.

The number of iterations in the horizon reconstruction algorithm to reach convergence of both methods was set to thirty. For the method of the invention, each identified triangle is subdivided in three pseudo-rectangles as described above. The twenty seven related control points then lead to one hundred and twenty six pseudo-rectangles. For the global optimization method disclosed by Lomask et al. each update term δτ computation through a direction descent approach required three hundred iterations and the algorithm had to be initialized with a function $\tau_0$ close to the solution. This function $\tau_0$ was obtained from a horizon reconstructed over the entire domain by assuming that only one particular related control point was known.

Table 1 resumes the computation time in seconds that was measured using both methods. The time in parentheses corresponds to the time measured for the calculations dedicated to the Fourier transforms.

TABLE 1

| Size of rectangular domain (new domain) | Method of the invention | | Method disclosed by Lomask et al. |
|---|---|---|---|
| | Normal size | Optimal size | |
| smallest | 3.3 s (1.41 s) | 2.7 s (0.561 s) | 79.1 s |
| largest | 9.98 s (5.47 s) | 6.43 s (2.41 s) | |
| arithmetic mean | 5.82 s (2.9 s) | 4.26 s (1.56 s) | |
| geometric mean | 5.4 s (2.54 s) | 3.78 s (1.4 s) | |

Table 1 shows the time required to do calculations on the portions of the three-dimensional domain 1 based on the size of the domain. The column labeled normal size gives the measured time that elapsed during the implementation of the method of the invention on portions of a domain that did not have a size optimized for fast Fourier transforms. The column labeled optimal size gives the same data but measured on portions of a domain that had a size suitable for implementing a fast Fourier transform algorithm. The line labeled smallest corresponds to the smallest defined portions of domains, the line labeled largest corresponds to the largest defined portions of domains, and the arithmetic and geometric means give times calculated based on a mean value of the size of the rectangular domains. It arises from the data of table 1 that the method of the invention enables reducing the computation time by as much as thirty times when compared to global approaches like the one disclosed by Lomask et al.

Another test was conducted to determine the time that can be saved using the method of the invention when modification instructions regarding the related control points are received. Table 2 summarizes the times in seconds measured for implementing the method of the invention when increasing the number of related control points from thirteen to twenty-seven. The time in parentheses corresponds to the time measured for the calculations dedicated to the Fourier transforms. In the column labeled entire reconstruction, the measured times are substantially the same, since the volume on which the computation is implemented is the entire three-dimensional domain 1. In the column labeled incremental reconstruction, the method is only applied to the portion of the three-dimensional domain 1 which is affected by the addition of new related control points.

TABLE 2

| Number of related control points | Entire reconstruction | Incremental reconstruction |
|---|---|---|
| 13 | 3.8 s (1.4 s) | |
| 18 | 3.73 s (1.4 s) | 0.627 s (0.219 s) |
| 23 | 3.72 s (1.38 s) | 0.603 s (0.233 s) |
| 27 | 3.78 s (1.4 s) | 0.5 s (0.184 s) |

It appears from table 2 that the selective computation of portions of a horizon on only those parts that are affected by the addition or removal of related control points further enhances the computational speed of the method.

Figure 13:
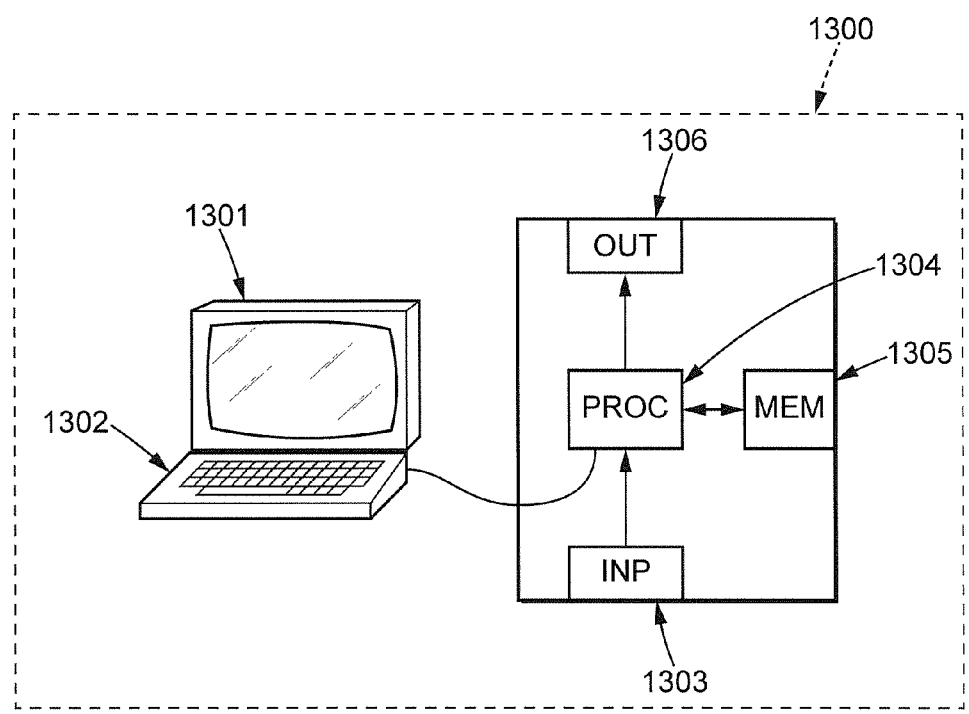
FIG. 13 is a possible embodiment for a device that enables the present invention.

FIG. 13 is a possible embodiment for a device that enables the present invention.

In this embodiment, the device 1300 comprises a computer, this computer comprising a memory 1305 to store program instructions loadable into a circuit and adapted to cause circuit 1304 to carry out the steps of the present invention when the program instructions are run by the circuit 1304.

The memory 1305 may also store data and useful information for carrying the steps of the present invention as described above.

The circuit 1304 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for <<Field-Programmable Gate Array>>).

This computer comprises an input interface 1303 for the reception of data used for the above method according to the invention and an output interface 1306 for providing a stacked model.

To ease the interaction with the computer, a screen 1301 and a keyboard 1302 may be provided and connected to the computer circuit 1304.

The invention is not limited to the embodiments described above and may encompass equivalent embodiments.

For example, it is possible to define non quadrangular surfaces in the reference plane. Instead of defining pseudo-rectangles, it may for example be possible to define surfaces for which diffeomorphic transformations, transforming these surfaces into circles, can be obtained. Indeed, a rapid resolution of the Poisson equation in a domain having a circular section, instead of a rectangular section, is possible.

It is possible to apply the diffeomorphic transformation F to a current pseudo-rectangle before calculating boundary conditions associated with the current pseudo-rectangle.

It is also possible to define some pseudo-rectangles which are not associated with any related control point. Although doing so might seem less advantageous from a computational point of view, it may be interesting in the case in which large gaps exist between local concentrations of related control points. Defining pseudo-rectangles that are not associated with any related control point may allow mapping a continuous portion of the three-dimensional domain 1 without having a high dispersion in the size of the pseudo-rectangles. It is also possible to have pseudo-rectangles that are not associated with any related control point, but which are adjacent to other pseudo-rectangles which are. Thereby, it is possible to use the boundary conditions of the neighboring pseudo-rectangles to meet the conditions enabling a direct resolution of the Poisson equation.

The method described above may also be implemented in a domain comprising more than three dimensions.

One may also define quadrangles that are not pseudo-rectangles, although this may render the calculation of the diffeomorphic transformations more complicated.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for enhancing the determination, from a seismic image, of at least a portion of a seismic horizon in a three-dimensional domain comprising axes $\vec{X}$, $\vec{Y}$, $\vec{Z}$, said seismic horizon being a function of coordinates along axes $\vec{X}$, $\vec{Y}$ in said three-dimensional domain, wherein said method comprises:
- receiving the seismic image, the seismic image having points associated with coordinates along axes $\vec{X}$, $\vec{Y}$, $\vec{Z}$;
- receiving a plurality of related control points associated with coordinates on axes $\vec{X}$, $\vec{Y}$, $\vec{Z}$;
- in a reference plane defined by axes $\vec{X}$ and $\vec{Y}$, defining, for at least one related control point among the plurality of related control points, an associated reference point with coordinates along axes $\vec{X}$, $\vec{Y}$, among a plurality of reference points, the reference point having coordinates on axes $\vec{X}$ and $\vec{Y}$ identical to coordinates on axes $\vec{X}$ and $\vec{Y}$ of the related control point,
- defining pseudo-rectangles in said reference plane, each pseudo-rectangle comprising a reference point among a plurality of reference points;
- for each current pseudo-rectangle among the defined pseudo-rectangles:
  - applying a diffeomorphic transformation F, said diffeomorphic transformation F:
    - being a function of coordinates along $\vec{X}$, $\vec{Y}$ and defining a new domain comprising axes $\vec{X'}$, $\vec{Y'}$, $\vec{Z}$;
    - transforming points of the seismic image having coordinates along axes $\vec{X}$, $\vec{Y}$ identical to coordinates along axes $\vec{X}$, $\vec{Y}$ of points in said current pseudo-rectangle, said points of the seismic image including the related control point associated with the current pseudo-rectangle;
  - transforming said current pseudo-rectangle into a corresponding rectangle;
  - applying a horizon reconstruction algorithm to the transformed points, to determine a part of a transformed horizon, said part of a transformed horizon comprising the transformed related control point, the reconstruction of the seismic horizon comprising solving the Poisson equation $\Delta(\delta\tau) = -\text{div}(r)$, where $\delta\tau$ is an unknown function of coordinates along axes $\vec{X'}$, $\vec{Y'}$, $\Delta$ denotes the Laplace operator in the new domain, div denotes the divergence vector operator in the new domain and r is a fixed function of coordinates along axes $\vec{X'}, \vec{Y'}$;

computing a part of the horizon, said computing of a part of the horizon comprising applying an inverse diffeomorphic transformation $F^{-1}$ to the determined part of a transformed horizon.

2. The method of claim 1 wherein, a pseudo-rectangle is defined so that the reference point comprised in a pseudo-rectangle belongs to a current reference edge of said pseudo-rectangle.

3. The method of claim 2, wherein prior to applying a diffeomorphic transformation F, said method comprises applying, for each current pseudo-rectangle comprising a reference point belonging to a current reference edge of said pseudo-rectangle among the defined pseudo-rectangles, for each current reference edge of said current pseudo-rectangle, a horizon reconstruction algorithm to edge points having coordinates along axes $\vec{X}, \vec{Y}$ identical to the coordinates along axes $\vec{X}, \vec{Y}$ of reference edge points of said current reference edge.

4. The method of claim 1, wherein at least one reference corner of each pseudo-rectangle among the defined pseudo-rectangles has coordinates along axes $\vec{X}, \vec{Y}$ identical to the coordinates along axes $\vec{X}, \vec{Y}$ of a related control point among the plurality of related control points.

5. The method of claim 1, wherein the received plurality of related control points comprises at least three related control points, and wherein defining pseudo-rectangles comprises:
identifying reference points in a reference plane;
identifying triangles having a first reference corner, a second reference corner and a third reference corner among the identified reference points using a triangulation, and in each of the identified triangles:
identifying a reference centroid of said triangle,
identifying a first reference center of the segment defined by the first reference corner and the second reference corner;
identifying a second reference center of the segment defined by the first reference corner and the third reference corner;
wherein a pseudo rectangle is defined by segments connecting the first reference corner with the first reference center, the first reference center with the reference centroid, the reference centroid with the second reference center and the second reference center with the first reference corner.

6. The method of claim 5, wherein prior to applying a diffeomorphic transformation F, the method comprises, for an identified triangle:
identifying a first, second and third related control point among the plurality of related control points associated with corresponding first, second and third reference corners of said identified triangle;
applying a horizon reconstruction algorithm to points of a plane comprising axis $\vec{Z}$ and comprising the first and second related control points to determine a first portion of a first local horizon;
identifying a first related central point on the first portion of the first local horizon having coordinates along axes $\vec{X}$ and $\vec{Y}$ identical to coordinates along axes $\vec{X}$ and $\vec{Y}$ of the first reference center;

applying a horizon reconstruction algorithm to points of a plane comprising axis $\vec{Z}$ and comprising the first and third related control points to determine a second portion of a second local horizon;
identifying a second related central point on the second portion of the second local horizon having coordinates along axes $\vec{X}$ and $\vec{Y}$ identical to coordinates along axes $\vec{X}$ and $\vec{Y}$ of the second reference center;
computing a coordinate along axis $\vec{Z}$ of a related middle point having coordinates along axes $\vec{X}$ and $\vec{Y}$ identical to coordinates along axes $\vec{X}$ and $\vec{Y}$ of the reference centroid of said identified triangle, the computation of said coordinate along axis $\vec{Z}$ being a function of the coordinates of a point on said determined first or second local horizons.

7. The method of claim 6, wherein computing a coordinate along axis $\vec{Z}$ of the related middle point of said identified triangle is achieved by applying a horizon reconstruction algorithm to points of a plane comprising axis $\vec{Z}$ and comprising the segment connecting the first reference center with the reference centroid or the segment connecting the second reference center with the reference centroid.

8. The method of claim 6, wherein computing a coordinate along axis $\vec{Z}$ of the related middle point is achieved by calculating the mean value of the coordinates along axis $\vec{Z}$ of at least the first and second related central points.

9. The method of claim 1, wherein the Poisson equation is solved using a Fourier transform algorithm.

10. The method of claim 1, wherein the defined pseudo-rectangles map a continuous portion of the reference plane.

11. The method of claim 1, wherein the method further comprises computing a portion of a seismic horizon from at least the computed part of the horizon of each current pseudo-rectangle among the defined pseudo-rectangles.

12. The method of claim 5, wherein the method further comprises computing a portion of a seismic horizon from at least the computed part of the horizon of each current pseudo-rectangle among the defined pseudo-rectangles, and after computing a portion of a seismic horizon, the method comprises:
receiving modification information relating to the related control points;
identifying pseudo-rectangles affected by said received modification information relating to the related control points;
defining a new set of pseudo-rectangles in a local area corresponding to the area occupied by said pseudo-rectangles affected by said received modification information relating to the related control points;
for each current pseudo-rectangle among the new set of pseudo-rectangles:
applying a diffeomorphic transformation F, said diffeomorphic transformation F;
being a function of coordinates along $\vec{X}, \vec{Y}$ and defining a new domain comprising axes $\vec{X'}, \vec{Y'}, \vec{Z'}$;
transforming points of the seismic image having coordinates along axes $\vec{X}, \vec{Y}$ identical to coordinates along axes $\vec{X}, \vec{Y}$ of points in said current pseudo-rectangle, said points of the seismic image including the related control point associated with the current pseudo-rectangle;

transforming said current pseudo-rectangle into a corresponding rectangle;
applying a horizon reconstruction algorithm to the transformed points, to determine a part of a transformed horizon, said part of a transformed horizon comprising the transformed related control point, the reconstruction of the seismic horizon comprising solving the Poisson equation $\Delta(\delta\tau)=-\text{div}(r)$, where $\delta\tau$ is an unknown function of coordinates along axes $\vec{X'}, \vec{Y'}$, $\Delta$ denotes the Laplace operator in the new domain, div denotes the divergence vector operator in the new domain and r is a fixed function of coordinates along axes $\vec{X'}, \vec{Y'}$;
computing a part of the horizon, said computing of a part of the horizon comprising applying an inverse diffeomorphic transformation $F^{-1}$ to the determined part of a transformed horizon.

13. A device for enhancing the determination, from a seismic image, of at least a portion of a seismic horizon in a three-dimensional domain comprising axes $\vec{X}, \vec{Y}, \vec{Z}$, said seismic horizon being a function of coordinates along axes $\vec{X}, \vec{Y}$ in said three-dimensional domain,
wherein said device comprises:
an input interface for receiving the seismic image, the seismic image having points associated with coordinates along axes $\vec{X}, \vec{Y}, \vec{Z}$; and for receiving a plurality of related control points associated with coordinates on axes $\vec{X}, \vec{Y}, \vec{Z}$;
a circuit for defining, in a reference plane defined by axes $\vec{X}$ and $\vec{Y}$, for at least one related control point among the plurality of related control points, an associated reference point with coordinates along axes $\vec{X}, \vec{Y}$, among a plurality of reference points, the reference point having coordinates on axes $\vec{X}$ and $\vec{Y}$ identical to coordinates on axes $\vec{X}$ and $\vec{Y}$ of the related control point,
a circuit for defining pseudo-rectangles in the reference plane, each pseudo-rectangle comprising a reference point among a plurality of reference points
a circuit being adapted for, for each current pseudo-rectangle among the defined pseudo-rectangles:
applying a diffeomorphic transformation F, said diffeomorphic transformation F:
being a function of coordinates along $\vec{X}, \vec{Y}$ and defining a new domain comprising axes $\vec{X'}, \vec{Y'}, \vec{Z}$;
transforming points of the seismic image having coordinates along axes $\vec{X}, \vec{Y}$ identical to coordinates along axes $\vec{X}, \vec{Y}$ of points in said current pseudo-rectangle, said points of the seismic image including the related control point associated with the current pseudo-rectangle;
transforming said current pseudo-rectangle into a corresponding rectangle;
applying a horizon reconstruction algorithm to the transformed points, to determine a part of a transformed horizon, said part of a transformed horizon comprising the transformed related control point, the reconstruction of the seismic horizon comprising solving the Poisson equation $\Delta(\delta\tau)=-\text{div}(r)$, where $\delta\tau$ is an unknown function of coordinates along axes $\vec{X'}, \vec{Y'}$, $\Delta$ denotes the Laplace operator in the new domain, div denotes the divergence vector operator in the new domain and r is a fixed function of coordinates along axes $\vec{X'}, \vec{Y'}$;
computing a part of the horizon, said computing of a part of the horizon comprising applying an inverse diffeomorphic transformation $F^{-1}$ to the determined part of a transformed horizon.

14. A non-transitory computer readable storage medium, having stored thereon a computer program comprising program instructions, the computer program being loadable into a data-processing unit and adapted to cause the data-processing unit to carry out a method for enhancing the determination, from a seismic image, of at least a portion of a seismic horizon in a three-dimensional domain comprising axes $\vec{X}, \vec{Y}, \vec{Z}$, said seismic horizon being a function of coordinates along axes $\vec{X}, \vec{Y}$ in said three-dimensional domain, wherein said method comprises:
receiving the seismic image, the seismic image having points associated with coordinates along axes $\vec{X}, \vec{Y}, \vec{Z}$;
receiving a plurality of related control points associated with coordinates on axes $\vec{X}, \vec{Y}, \vec{Z}$;
in a reference plane defined by axes $\vec{X}$ and $\vec{Y}$, defining, for at least one related control point among the plurality of related control points, an associated reference point with coordinates along axes $\vec{X}, \vec{Y}$, among a plurality of reference points, the reference point having coordinates on axes $\vec{X}$ and $\vec{Y}$ identical to coordinates on axes $\vec{X}$ and $\vec{Y}$ of the related control point,
defining pseudo-rectangles in said reference plane, each pseudo-rectangle comprising a reference point among a plurality of reference points;
for each current pseudo-rectangle among the defined pseudo-rectangles:
applying a diffeomorphic transformation F, said diffeomorphic transformation F;
being a function of coordinates along $\vec{X}, \vec{Y}$ and defining a new domain comprising axes $\vec{X'}, \vec{Y'}, \vec{Z}$;
transforming points of the seismic image having coordinates along axes $\vec{X}, \vec{Y}$ identical to coordinates along axes $\vec{X}, \vec{Y}$ of points in said current pseudo-rectangle, said points of the seismic image including the related control point associated with the current pseudo-rectangle;
transforming said current pseudo-rectangle into a corresponding rectangle;
applying a horizon reconstruction algorithm to the transformed points, to determine a part of a transformed horizon, said part of a transformed horizon comprising the transformed related control point, the reconstruction of the seismic horizon comprising solving the Poisson equation $\Delta(\delta\tau)=-\text{div}(r)$, where $\delta\tau$ is an unknown function of coordinates along axes $\vec{X'}, \vec{Y'}$, $\Delta$ denotes the Laplace operator in the new domain, div denotes the divergence vector operator in the new domain and r is a fixed function of coordinates along axes $\vec{X'}, \vec{Y'}$;

computing a part of the horizon, said computing of a part of the horizon comprising applying an inverse diffeomorphic transformation $F^{-1}$ to the determined part of a transformed horizon.

* * * * *